United States Patent
Roos et al.

(10) Patent No.: US 11,001,223 B2
(45) Date of Patent: May 11, 2021

(54) METHOD OF MANUFACTURING AN AIRBAG MINI-PACK

(71) Applicant: Key Safety Systems, Inc., Sterling Heights, MI (US)

(72) Inventors: Peter Roos, Bayern (DE); Holger Maul, Hessen (DE)

(73) Assignee: Key Safety Systems, Inc., Sterling Heights, MI (US)

(*) Notice: Subject to any disclaimer, the term of this patent is extended or adjusted under 35 U.S.C. 154(b) by 166 days.

(21) Appl. No.: 16/204,174

(22) Filed: Nov. 29, 2018

(65) Prior Publication Data

US 2019/0193669 A1  Jun. 27, 2019

Related U.S. Application Data

(60) Provisional application No. 62/610,774, filed on Dec. 27, 2017.

(51) Int. Cl.
*B60R 21/237* (2006.01)
*B60R 21/235* (2006.01)
*B29L 22/02* (2006.01)

(52) U.S. Cl.
CPC ........ *B60R 21/237* (2013.01); *B60R 21/235* (2013.01); *B29L 2022/027* (2013.01); *B60R 2021/2375* (2013.01); *B60R 2021/23509* (2013.01); *B60R 2021/23533* (2013.01)

(58) Field of Classification Search
CPC ............... B60R 21/237; B60R 21/235; B60R 2021/2375; B60R 2021/23509; B60R 2021/23533; B29L 2022/027
USPC ............................... 280/728.2, 743.1, 728.1
See application file for complete search history.

(56) References Cited

U.S. PATENT DOCUMENTS

| | | | |
|---|---|---|---|
| 5,022,676 | A | 6/1991 | Rogerson et al. |
| 9,205,797 | B2 | 12/2015 | Ostman et al. |
| 9,333,933 | B2 | 5/2016 | Kunkel et al. |
| 2012/0267880 | A1 | 10/2012 | Frisk et al. |
| 2017/0057446 | A1 | 3/2017 | Jenny et al. |
| 2017/0136662 | A1* | 5/2017 | Komatsu ............... B60R 21/237 |

FOREIGN PATENT DOCUMENTS

| | | |
|---|---|---|
| EP | 1031473 | 8/2000 |
| GB | 1202288 | 8/1970 |
| WO | 2016069543 | 5/2016 |
| WO | 2017029388 | 2/2017 |

* cited by examiner

*Primary Examiner* — Keith J Frisby
(74) *Attorney, Agent, or Firm* — Meunier Carlin & Curfman LLC

(57) ABSTRACT

A method of manufacturing a folded airbag comprising the steps of: providing an airbag cushion; heating the airbag material, folding the heated airbag material; compressing the folded airbag material obtained in step c) and optionally cooling the compressed airbag.

17 Claims, 2 Drawing Sheets

METHOD OF MANUFACTURING AN AIRBAG MINI-PACK

FIELD OF THE INVENTION

The present invention relates to a method of conditioning airbag material such as a woven fabric prior to folding to soften the fabric enabling the manufacture of a folded airbag package having reduced dimensions. More particularly according to the primary embodiment of the invention the airbag material is preferably heated by infrared energy to soften the airbag material enabling the material to subsequently be more easily folded to create a small airbag package also referred to as a mini-pack.

BACKGROUND AND SUMMARY OF THE INVENTION

In general, airbag packages are formed of a folded airbag and the folds have the tendency to unfold in the airbag housing thereby increasing their volume and causing packing problems both during assembly of the airbag module and during installation of the airbag module in a vehicle due to the limited space provided for it in the vehicle.

There have been several proposals in the art to solve these problems. The methods known in the prior art relate to manufacturing airbag packs by means of folding and pressing the airbag and heating the airbag prior to or simultaneously with the pressing step. It was proposed in U.S. Pat. No. 9,333,933B2 to insert the folded airbag in a moulding element and press the folded airbag to compress it while heating the compressed and folded airbag to a temperature comprised between 125° C. and 150° C. for at least 1-2 hours, then rapidly cooling the compressed airbag within the moulding element by at least 100° C.

A method of packaging an airbag for motor vehicles is disclosed in U.S. Pat. No. 9,205,797B2. The method comprises the steps of folding an airbag and at least partially wrapping it with an initially flexible cover to form an intermediate package, and simultaneously heating and pressing the intermediate package to form a compressed package having a stable shape by the fused fibers of the cover material.

U.S. Pat. No. 5,022,676A discloses a method of folding an airbag to provide an airbag module with reduced size. Also this prior art document teaches the application of pressure to the folded airbag and heating the folded and pressed airbag. In particular, the folded airbag is pressed and simultaneously or subsequently, it is subjected to heat treatment. Alternatively, the folded airbag can be heated prior to the pressing step. The heating can be achieved by heating the ambient air to directly heat the airbag material and/or various pressing dies can be heated to heat the airbag material by convection.

The method for assembling a gas bag for a vehicle occupant disclosed in WO2017/029388 (A1) includes the compression of a rolled airbag or a folded airbag within a pressing device into an airbag package having a reduced volume and heating the rolled/folded airbag or the airbag package in said pressing device and cooling the airbag package that maintains its reduced volume.

A further method for forming an airbag cushion including a heating step is disclosed in WO 2016/069543 (A1). A folded airbag is placed into a vacuum bag and the air is evacuated from said bag by applying vacuum and a pressure on the airbag. The airbag cushion is compacted thereby and the vacuum bag containing the airbag is placed in a heating chamber to thermally set the shape of the compacted airbag.

Similarly to the above cited prior art documents, also US2012/0267880 A1, GB1202288 and US 2017/057446 (A1) A disclose a method for manufacturing an airbag comprising the step of simultaneously compressing and heating a folded airbag into a package that maintains its shape.

EP1031473A2 discloses a method for manufacturing an airbag package. A folded airbag is sealingly covered by a gas-tight film and vacuum is applied to evacuated air encapsulated below said film. During vacuum application the folded airbag is compressed, the action of the atmospheric air-pressure and heat is applied to thermally set the synthetic fibers of the airbag. When vacuum and heating applications are stopped, the gas-tight film is removed. The obtained compressed airbag has a reduced dimension wherein the folds are thermally set.

Thus, it is evident that conventional methods for preparing a folded airbag package having a reduced dimension requires apparatuses which allow the heating of the entire thickness of the already folded airbag and, accordingly, the heating may not be uniformly distributed in the thickness of the folded airbag and the folds next to the heating surface could be overheated with respect to the folds in the middle of the airbag pack within the pressing mould. In addition, the known methods require particularly designed pressing moulds to transmit heat around the external surface of the folded airbag or, if the heating is subsequently carried out to the pressing step, further manipulation of the already compressed airbag.

It is an aim of the present invention to solve the above problems and to provide a method for packaging an airbag cushion in a small package in a simple and efficient manner that allows maintaining the airbag in folded condition, i.e. providing a continuous dimension stability for the folded airbag.

The present invention provides a method of manufacturing an airbag mini pack comprising the steps of:
 a) providing an airbag cushion made of fabric material;
 b) heating the airbag cushion using infrared energy or another heat source;
 c) subsequently folding the heated airbag material;
 d) compressing the folded airbag material obtained in step c) and optionally
 e) cooling the compressed airbag obtained in step d).

According to a possible embodiment of the present invention, the airbag cushion is continued to be heated also during the folding step in order to further improve the efficiency of the method of the present invention and to provide an airbag pack with much reduced dimensions.

The airbag material may be any type of material suitable to have a reduced stiffness by subjecting it to heating. The airbag cushion material may be coated or uncoated. Preferably, the airbag cushion is made of a fabric material. By way of non-limitative examples the following materials, useful in the present invention for the airbag cushion, are mentioned: polyamide (PA 66) and polyethylene terephthalate (PET), which may be coated, uncoated or partially coated.

The heating of the airbag cushion is carried out by any known means suitable to expose the airbag fabric material to a high temperature environment comprised between a defined range for example between +50° C. and 150° C. During heating the airbag cushion prior to the folding step, the heating is carried out by means of at least one heating element placed upstream of the folding device.

By means of examples the following heating elements are mentioned herein without any limitation of the scope of the present invention: heat mats, infrared sources, hot air, heating foils and other heating devices.

In a preferred embodiment, the airbag cushion is straightened by means of fastening a first portion of the airbag by fastening means, such as by a folding clamp, and introducing a second portion thereof into a folding device. The airbag cushion is heated before folding and, preferably, also during folding. The folded airbag is compressed by applying a predefined load and, finally, the compressed airbag is left to cool or is cooled by appropriate known means. The obtained compressed and folded airbag stably maintains its small volume.

It will be appreciated that the heating time and the heating temperature need to be adjusted to the type of airbag material and to the amount of layers which need to be heated. The adaptation of these parameters of the method of the present invention to the airbag material and to the fabric layer thickness requires ordinary skill in the art.

When the heating element is an infrared (IR) source, the distance of the external surface of the airbag material from the IR source should be defined in function of the airbag material type, the intensity of IR beam as well as IR beam length to achieve a sufficient warming up of the airbag material/layers and to prevent the airbag material from damage by strong heat impact. It has been found the shape of the airbag cushion does not influence the efficiency of the heat treatment by using an IR source, because the intensity and the shape of the IR beams can be controlled accordingly in a known way for a skilled person. Preferably, the IR beams are perpendicular to the airbag fabric material.

In particular, in case of using an IR source as a heating element, one extremity of the airbag cushion should be placed in the folding device and the exterior surface of the airbag material needs to be located in a defined distance from the IR source for ensuring a proper and reliable heating, i.e. warming of the airbag material, e.g. in a distance of approximatively 100 mm-150 mm. Should the IR source be too close to the fabric material, the heat transmitted by the IR beams would damage the airbag material, whereas should the IR source be located too far, the IR heat impact in the airbag material would not be sufficient to warm up the fabric to a temperature necessary to reduce the stiffness of the airbag cushion material. Should the heating element be a heated surface, such as a heating foil, said surface needs to contact the fabric material to transfer heat by heat conduction.

According to the method of the present invention, it is possible to heat the entire surface of the airbag cushion material or only a part thereof where the airbag material is too stiff for folding. In an embodiment of the present invention, where the heating of the airbag material is conducted also during folding, it is possible to heat only the area of the airbag material, which is effectively moving under the IR beam with a defined velocity experimentally set in accordance with the type of airbag fabric material, layer thickness and IR beams intensity. Accordingly, also a large surface can be heated with a relatively narrow IR beam during the folding step.

In general, it is sufficient to heat only one side of the airbag cushion with IR beams, because the IR beams are able to penetrate the fabric material to a certain amount of layers as known in the art thus it is possible to heat multiple layers from one side. However, in case of too many fabric layers, i.e. a high airbag cushion thickness, the penetration of the IR beams may not be sufficient, thus the heating should be carried out from multiple sides of the airbag cushion to reduce the time necessary for reaching the specified temperature. When the temperature of the airbag cushion material reaches a specified temperature, i.e. it is soft and has a reduced stiffness, the folding is initiated. Preferably, the heating is continued during folding up to the completion of the folding step.

Should the heating element be a heating surface, such as heat mats or heating foils, it advantageously contacts the surface of the airbag fabric material to transfer heat by conduction. Heating foils particularly suitable in the present invention are those commonly known and commercialised. The known conventional heating foils are applied to carrier plates which prevent the heating foil from folding onto the airbag surface. The heating foils are applied to the airbag surface and the airbag is heated up by heat conduction to a specified temperature where the airbag material is softened or has a reduced stiffness to minimise the airbag package volume. Preferably both sides of the straightened airbag cushion are heated to reach the specified temperature in a short time and the folding is started.

The airbag material should be warmed up to entrap heat inside the fabric material as well as inside the folded airbag cushion until the completion of the folding. According to the present invention the term "warm material" refers to an airbag fabric material which is softened to such an extent to transform a stiff fabric material into a soft one and to reduce the spring effect which occurs when the folded airbag does not maintain its compressed form. The term "warm material" should not be interpreted as a melted material which could cause adhering the folded layers. Therefore, the time and the temperature of heating should be set accordingly and in function of the thickness of the airbag material as well as the composition of the fabric used for the airbag.

The term "heating" as used in the present invention indicates the exposure of the airbag fabric material to a high temperature environment that helps in achieving a better foldability of said fabric material.

Many different folding techniques are known and used in the field of airbag folding. Any one of the known folding techniques can be applied in the method of the present invention for folding the warm airbag material without any limitation.

After the airbag is heated and folded in accordance with method steps b) and c) of the present invention, the heated and folded airbag is compressed by applying any technique known for a skilled person for compacting folded airbags under pressure. Similarly, also the cooling step e) of the method of the present invention can be carried out in accordance with conventional techniques known in the field of the present invention.

The compression of the folded and heat treated airbag can be carried out by applying any technique known for a skilled person for compacting folded airbags under pressure. Similarly, also the cooling step of the method of the present invention can be carried out in accordance with the conventional techniques known in the field of the present invention. The cooling of the compressed and warm airbag cushion is an optional but preferred process step, because it promotes retaining the small dimensions of the obtained airbag mini-pack.

According to another aspect of the present invention a system for packing an airbag cushion in a mini-pack is provided. The system for packing an airbag cushion comprises an airbag, a folding device, a compressing device, optionally a cooling device and at least one heating element provided upstream of said folding device. The airbag is preferably straightened by appropriate means known in the art.

Any known type of folding and compressing devices are suitable in the present invention with the condition that they allow the positioning of the heating elements for the straightened airbag upstream the folding device. The heating elements are placed in a distance to ensure a proper, uniform and reliable heating of the airbag fabric material and layers to a specific temperature that render the airbag fabric soft and warm to be easily foldable. Not limitative examples for heating elements useful in the present invention are heat mats, infrared sources, hot air, heating foils and other suitable heating devices.

According to another aspect of the present invention, an apparatus is provided for packaging an airbag cushion into a mini-pack. The apparatus comprising a folding device fitted with at least one heating element suitable to heat an airbag cushion, a compressing device and optionally a cooling device suitable to cool a warm folded and compressed airbag cushion. In a preferred embodiment of the present invention, the heating element is placed at a side of the folding device which is assigned to receive the airbag cushion to be folded.

The present invention provides a method and a system for packing an airbag cushion in a mini-pack, wherein the heating of the airbag material is carried out before and, preferably, also during the folding of the airbag cushion material. The heating of the airbag cushion according to the method of the present invention allows a uniform warming of the airbag material along its length and thickness (through the layers forming the airbag cushion) and providing a warm airbag material for easy and efficient folding and compression steps.

The method, the system and the apparatus of the present invention provide improved technical effects such as a uniform warming up of the airbag cushion before its folding wherein the folded airbag is warm and has a reduced stiffness during the folding and compression steps; easy folding of the airbag cushion having a reduced stiffness as well as simplification of folding and compression of the airbag in a very reduced volume.

The airbag package obtainable by the method of the present invention has very small dimensions and is able to permanently retain its shape. Preferably, the airbag mini-pack is folded in an airbag housing.

BRIEF DESCRIPTION OF THE DRAWINGS

The invention will now be described in a non-limiting way with reference to the accompanying drawings, in which.

DETAILED DESCRIPTION OF THE DRAWINGS

Figure 3:
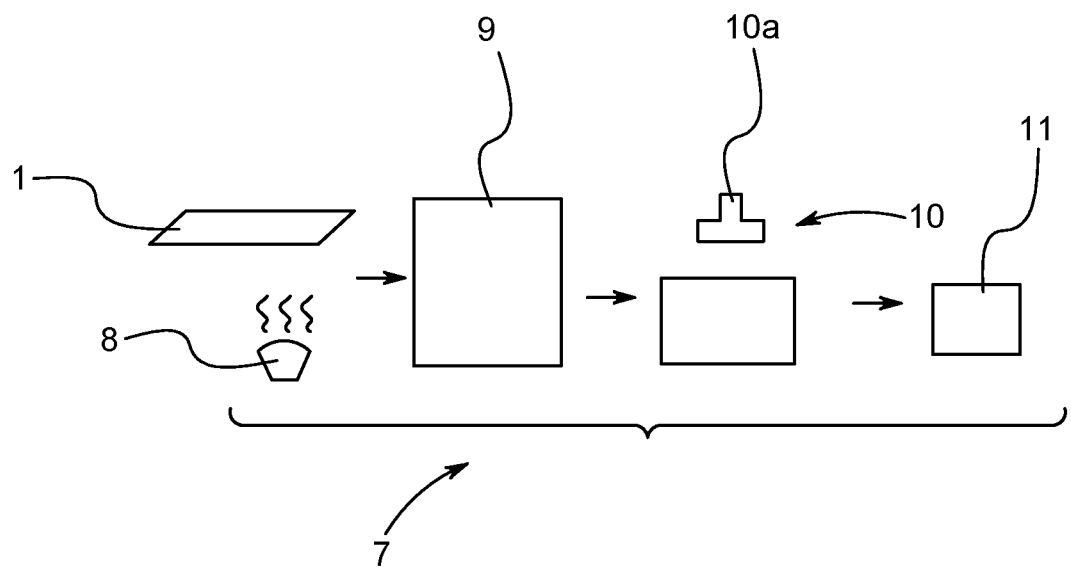
FIG. 3 is a schematic representation of an apparatus according to the invention.

Referring initially to FIG. 3, an apparatus 7 for folding air bag cushions 1 comprises a device 8 that can transfer heat to a cushion 1 to an extent sufficient to heat the cushion material. The material of the cushion is preferably a thermoplastic material, so that once heated it can become softer, i.e. more pliable, than when it is cold, e.g. at room temperature; the cushion may be made of a fabric, the fabric may be coated in a way known in the art. The invention provides for the cushion to be heated at least before it is folded, rather than after the folding step. The heated cushion 1 is then folded in a folding device 9, in a way known per se in the art; the folded airbag cushion is compressed in device 10, in a way known per se in the art and optionally cooled in cooling device 11.

Figure 1:
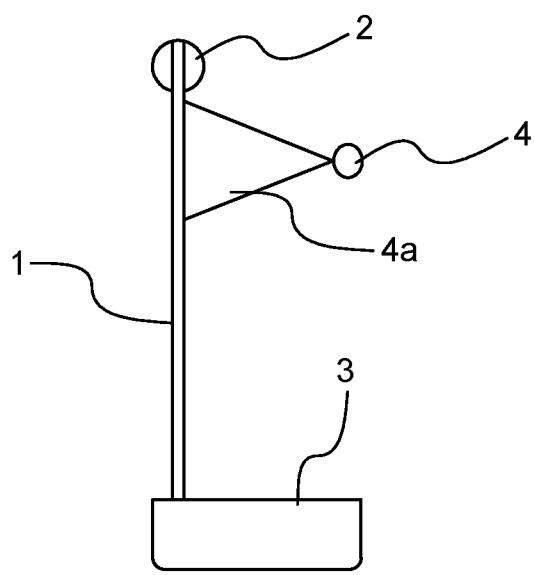
FIG. 1 is a schematic representation of heating the airbag cushion according to a first embodiment of the method of the present invention.
Figure 4:
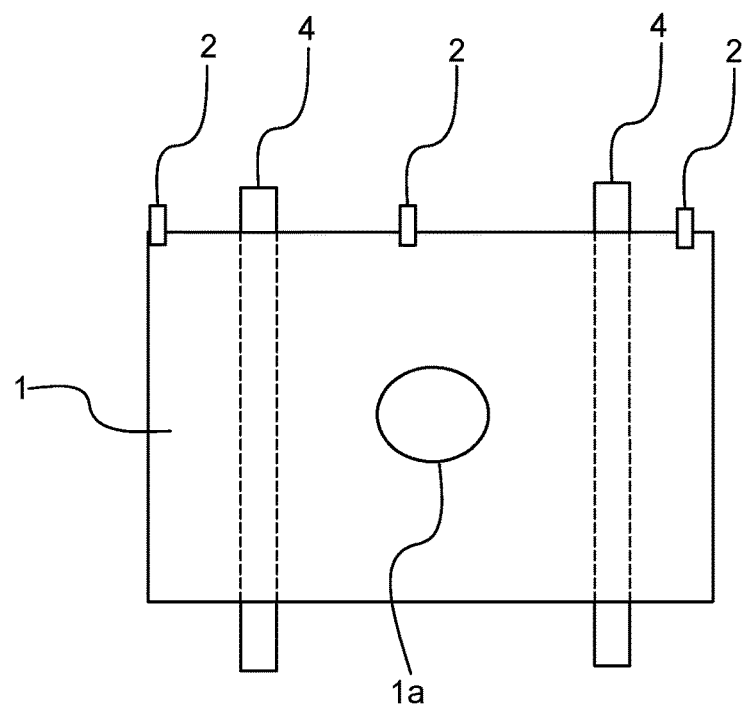
FIG. 4 shows another view of the present invention.

FIG. 1 schematically shows the first embodiment of the method and system of the present invention, wherein an IR source 4 is used for heating or warming up the airbag cushion 1 to a specified temperature to change its material characteristics to sufficiently soft but not melted or tacky and with reduced stiffness. The airbag cushion 1 is straightened by fastening a first portion of the airbag to fastening means, such as a folding clamp 2 and by introducing a second portion thereof into a folding device 9 (not shown in FIG. 1). The airbag cushion 1 is heated at least before the folding step; in one embodiment the cushion may be heated also during the folding step. The IR source 4 is placed at a distance that allows projecting a sufficiently intense IR beam 4a to warm the airbag fabric material and the layers of cushion 1 to a temperature specified in function of the features of the material of the airbag fabric. As stated above, the heating time is a function of the IR intensity, the distance of the IR source from the external surface of the airbag cushion, the airbag material and the thickness of the airbag layers. The skilled person can easily select the values for the above parameters. As can be appreciated only an edge view of the airbag illustrating the height of the airbag is shown in these figures. FIG. 4 shows a plan view of the material 1 with two spaced IR sources 4 as well as the neck or inlet 1a of the airbag. To achieve the desired heat transfer across the entire airbag the airbag can be moved relative to the heating source or the heating source can be moved or the heating source can have sufficient length and depth to enable its radiation to impinge upon the entire airbag without much if any relative movement.

The folded airbag is compressed in device 10 by applying a predefined load 10a and, finally, the compressed airbag is left to cool or is cooled by appropriate cooling means 11. The obtained compressed and folded airbag is placed into an airbag housing 3 and it stably maintains its small volume.

Figure 1A:
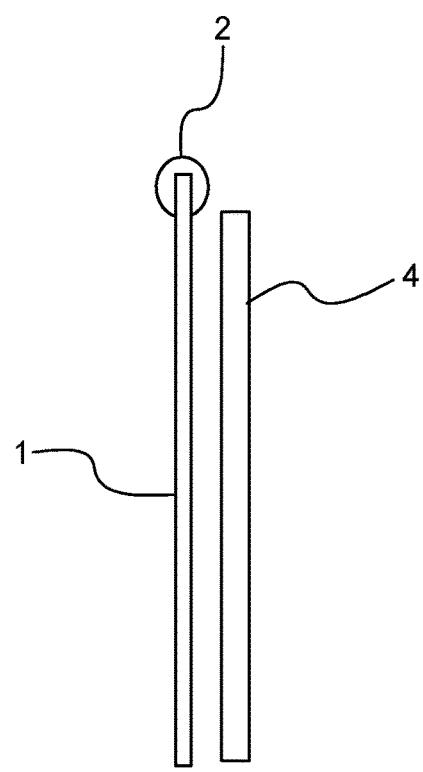
FIG. 1a is an alternate embodiment of the invention.

FIG. 1a shows an alternate embodiment wherein the IR source is of approximately the same length as the fabric to be heated. In this embodiment the IR source is removed from the folding device 10 requiring the heated airbag to be transported to the folding device.

Figure 2:
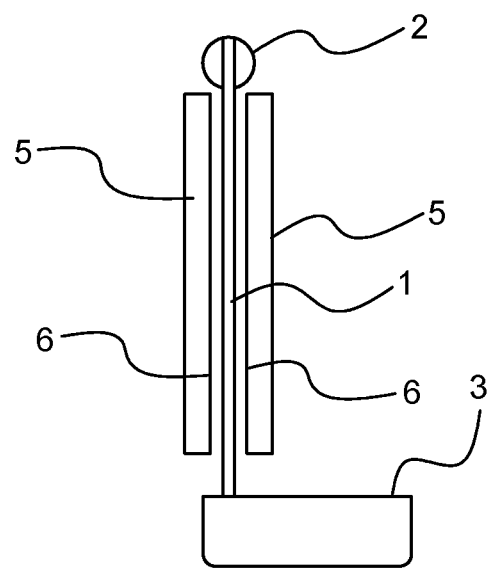
FIG. 2 is a schematic representation of heating the airbag cushion according to another embodiment of the method of the present invention.

FIG. 2 shows another embodiment of the method and system of the present invention, wherein the heating source is a pair of heating foils 5 applied on carrier plates 6 that transmit heat to the airbag material by conduction. One extremity of said carrier plates 6 is inserted in the folding device (not shown) or can be positioned therein automatically when the airbag cushion 1 is straightened or held by clamps 2 in the system for packing the airbag. In the shown embodiment, both sides of the airbag cushion are directly heated by the heating foils 5 to the required temperature and the heated airbag material or layers are moved to the folding device 9 (not shown in FIG. 2). In a possible embodiment, the heating of the airbag cushion is continued during the folding step to further improve the efficiency of folding and compression to minimise the airbag package.

The method of the invention preferably provides that the heating is carried out at a temperature comprised within the range from +50° C. to 150° C. In a possible embodiment the heating is carried out by at least one heating element selected from heat mats, heating foils, infrared sources or other heating devices; preferred heating means are selected form heating foils and IR sources or a combination thereof. When IR is used, the beams of the IR source are preferably perpendicular to the airbag material.

The following examples are provided for illustrating the present invention without limiting its scope to these examples.

Several experiments were conducted in order to provide some examples for the use of IR emitters according to the present invention for heating, i.e. warming up, different types of airbag materials to improve folding of airbag fabric materials and compression of the folded airbag into a pack having very reduced dimensions.

Example 1

Heating with IR Emitters

Some experiments were conducted with a short wave IR emitter manufactured by Optron GmbH, Type IRD S380SM powered by 2 kW. The IR emitter provided a maximum spectral emission of 1.2 μm for the airbag cushion and a heated length of 380 mm (beam apertures were 380 mm).

Different airbag fabric materials were tested in this experiment, which were coated, uncoated and partially coated. In particular, the tested airbag materials were made of the following yarns: 470 dtex PA66 coated fabric (nylon); 470 dtex PET coated fabric (polyethylene terephthalate); 350 dtex PA66 uncoated fabric and 350 dtex PA66 partially coated fabric.

The same experiments were repeated with the difference that the short IR emitter of Optron GmH, type IRD S750Z, powered by 6 kW and the heated length of airbag material was 750 mm (beam apertures were 750 mm).

In the above experiments using said two types of short wave IR emitters, the heating time was comprised within the range from 10 s to 50 s and the temperature on the external surface of the airbag material, which was in contact with the IR beams, was comprised within the range of 90° C.-140° C.

The heated airbag fabric was folded, compressed and cooled in a known way. The obtained airbag pack had a much reduced dimension with respect to the airbag packs manufactured by the known methods without applying heat or by the known methods wherein heat was applied to the already folded airbags.

Example 2

Heating with Heating Foils

Some experiments were conducted with a pair of commercially available heating foils that allowed to heat up the different types of airbag materials identified in Example 1. A heat foil was applied on two opposed sides of a straightened airbag material and an airbag surface of 120 mm×300 mm was heated on each side of the airbag by the heating foils, powered by 65 W at 220 V.

The results of these experiments confirm the invention is capable of achieving a significantly reduced folded and compressed airbag pack. In addition, the airbag pack obtained by means of the method of the present invention stably retains its compact a reduced dimension.

In a possible embodiment, the material of the airbag cushion may contain a material that can store heat during the folding step. Said heat storing material may be added as a filler to the cushion material, e.g. in the material that provides the coating to the fabric. Suitable materials are iron silicates, such as copper slag, as disclosed in KR application 10-2001-0058900 (KR2003-0028859) and in US2013/040082; iron silicates may also act as a heating means when irradiated by an electromagnetic field or electromagnetic waves, in particular by microwaves.

Many changes and modifications in the above-described embodiment of the invention can, of course, be carried out without departing from the scope thereof. Accordingly, that scope is intended to be limited only by the scope of the appended claims.

The invention claimed is:

1. A method of manufacturing a folded airbag comprising the steps of:
    a) providing an airbag material;
    b) heating the airbag material,
    c) folding the heated airbag material; and
    d) compressing the folded airbag material obtained in step c),
    wherein the heating is carried out by at least one infrared source.

2. The method according to claim 1, wherein the heating of the airbag material is continued during the folding step.

3. The method according to claim 1, wherein the airbag material is heated to a temperature within the range from +50° C. to 150° C.

4. The method of claim 1, wherein beams of the at least one infrared source are perpendicular to the airbag material.

5. The method according to claim 1, wherein the airbag material comprises a fabric material.

6. The method according to claim 5, wherein the airbag material further comprises a heat storing material.

7. The method according to claim 1, further comprising the step of cooling the compressed airbag material obtained in step d).

8. The method according to claim 7, wherein cooling the compressed airbag material comprises using a cooling device.

9. The method according to claim 1, wherein the airbag material is heated to a temperature within the range from +90° C. to 140° C.

10. The method according to claim 1, wherein the airbag material is heated for a heating time in the range of 10 seconds to 50 seconds.

11. The method according to claim 1, wherein the at least one infrared source is located approximately 100 mm-150 mm from an exterior surface of the airbag material.

12. The method according to claim 1, wherein the airbag material is moved relative to the at least one infrared source.

13. The method according to claim 1, wherein the at least one infrared source is moved relative to the airbag material.

14. The method according to claim 1, wherein heating the airbag material comprises heating the airbag material on at least two opposite facing portions of an exterior surface of the airbag material.

15. The method according to claim 1, wherein heating the airbag material comprises heating a portion of an exterior surface of the airbag material.

16. A method of manufacturing a folded airbag, the method comprising:
    a) providing an airbag material;
    b) heating the airbag material,
    c) folding the heated airbag material; and
    d) compressing the folded airbag material obtained in step c), wherein the airbag material comprises a fabric material and a heat storing material, wherein the heat storing material is an iron silicate.

17. A method of manufacturing a folded airbag, the method comprising:
- a) providing an airbag material;
- b) heating the airbag material,
- c) folding the heated airbag material; and
- d) compressing the folded airbag material obtained in step c), wherein the heating is carried out by at least one heating foil, wherein the at least one heating foil heats the airbag material by conduction.

* * * * *